R. L. WILLIAMS.
SOUND DETECTION PARTICULARLY ADAPTED FOR COAST DEFENSE.
APPLICATION FILED NOV. 8, 1917.

1,411,948.
Patented Apr. 4, 1922.
3 SHEETS—SHEET 2.

R. L. WILLIAMS.
SOUND DETECTION PARTICULARLY ADAPTED FOR COAST DEFENSE.
APPLICATION FILED NOV. 8, 1917.
1,411,948. Patented Apr. 4, 1922.
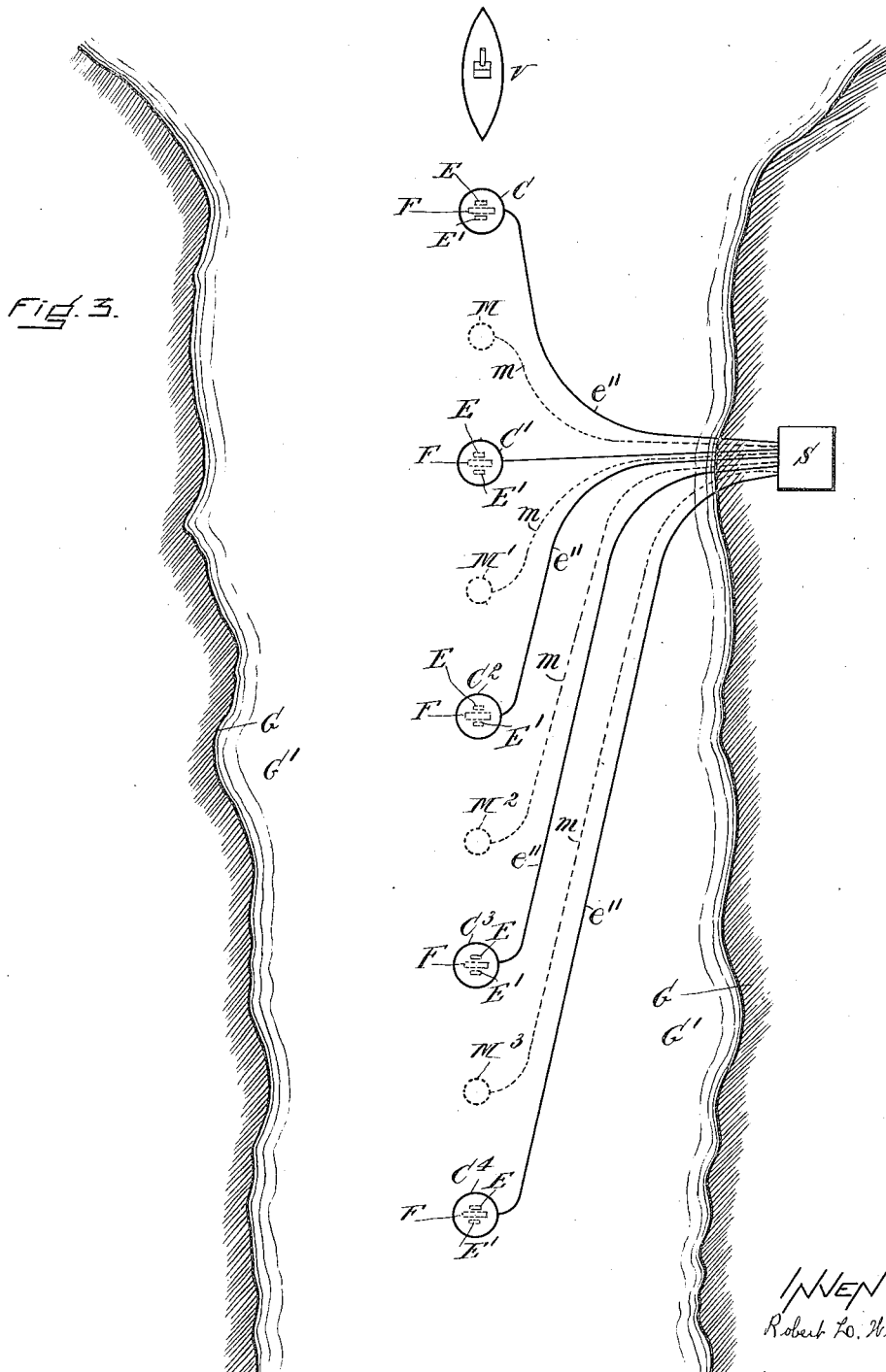

UNITED STATES PATENT OFFICE.

ROBERT L. WILLIAMS, OF NEWTON, MASSACHUSETTS, ASSIGNOR TO SUBMARINE SIGNAL COMPANY, OF PORTLAND, MAINE, A CORPORATION OF MAINE.

SOUND DETECTION PARTICULARLY ADAPTED FOR COAST DEFENSE.

1,411,948.  Specification of Letters Patent.  Patented Apr. 4, 1922.

Application filed November 8, 1917. Serial No. 200,887.

*To all whom it may concern:*

Be it known that I, ROBERT L. WILLIAMS, of Newton, in the county of Middlesex and State of Massachusetts, a citizen of the United States, have invented a new and useful Improvement in Sound Detection Particularly Adapted for Coast Defense, of which the following is a specification.

The primary purpose of my invention is to provide a means for coast defense and it consists in submerging one or more suitably protected detectors such as microphones in a channel or other suitable position where compressional or sound waves originating from an enemy ship will be received and transformed by the detectors into electrical waves and transmitted to a shore station comprising a suitable indicator such as a telephone receiver or the like, preferably one for each detector. The position of each detector being known the position of the vessel may be determined, at least approximately, by comparing the sounds or readings of the several indicators and if the channel is mined at known points, say between the detectors, the appropriate mine may be discharged from the shore station when the ship is approximately over it.

In carrying out my invention, I use a microphone of any well-known character, which microphone is as a whole made watertight and is rigidly mounted upon a rigid support in the channel, on the bottom of the harbor, or other place to be protected, and is protected from water currents or motion by a suitable casing, which casing is filled with water or other fluid in order that the sound waves may pass to the microphone with the least possible loss of force, all as now very well understood. The microphone is thus protected from excessive water noises which might be caused by the flow of water over the diaphragm of the microphone and thus interfere with the receipt of the sounds desired.

Under certain circumstances it may be screened from behind by a sound screen of well-known character, so that, for example, the noise of waves breaking on the shore or other shore sounds may be eliminated, or if, as is usual, it is desirable to receive sounds from two directions, a second microphone may be mounted upon the opposite side of the sound screen from the first, so that the microphones are back to back with the screen between them. In each case each microphone will have its own connection with its own receiving instrument, so that a listener may listen to or observe first the manifestations from one microphone and then those from the other, thus having an opportunity to compare results and determine the position of the source of sound.

So far as I am aware, heretofore there has been no application of a microphone to coast defense in the manner described, that is, the location of a simple microphone or a plurality of microphones, preferably screened from each other if there are more than one, and located in fixed positions so as to be particularly responsive to sounds coming from a given direction.

My invention will be understood by reference to the drawings in which—

Fig. 3 is a diagrammatic view of a harbor entrance or other channel protected in the manner referred to.

Figure 1:
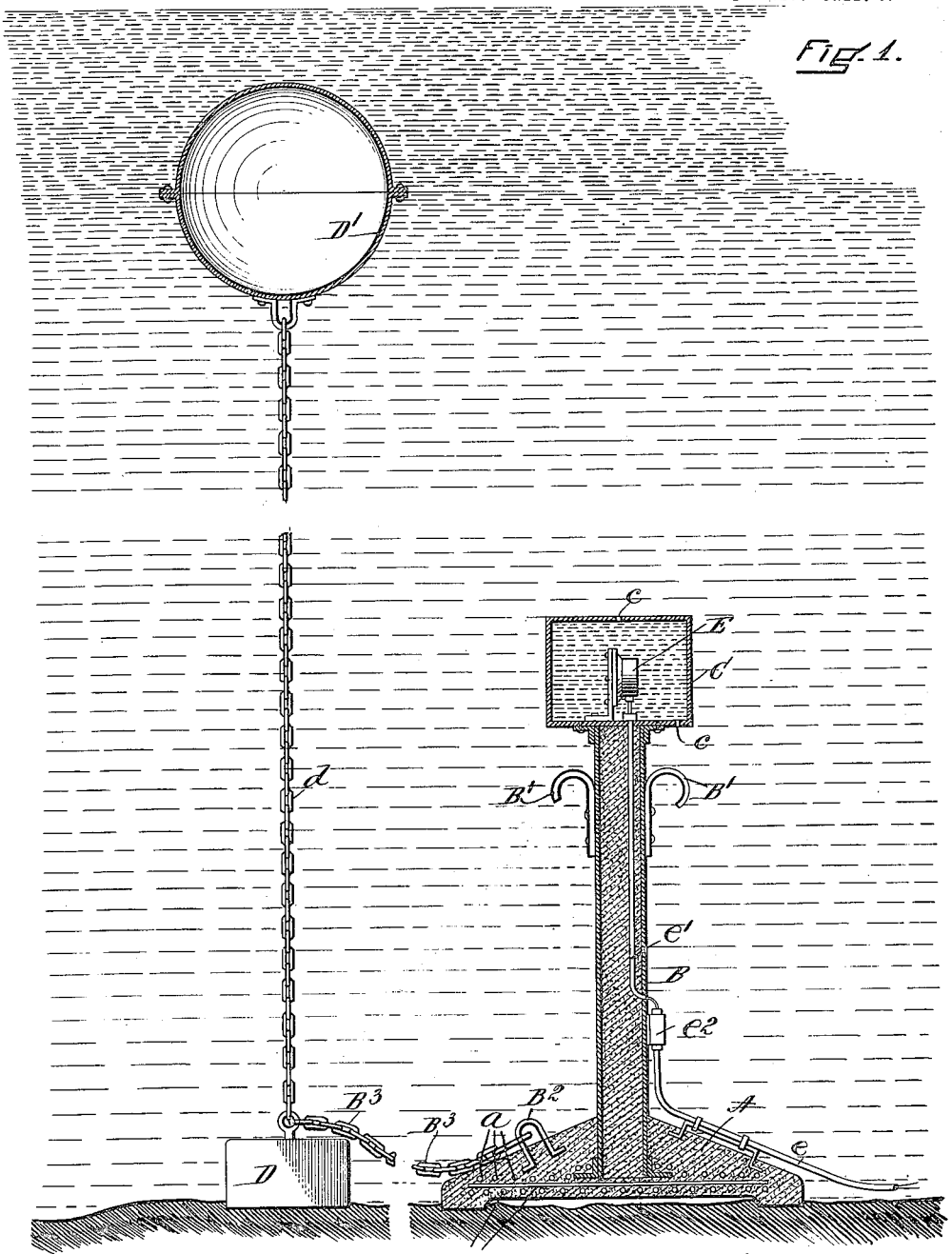
Fig. 1 shows in section the preferred mounting of a single microphone with which to carry out my invention.

In Fig. 1, A is the base having a considerable area and adapted to rest upon the bottom of the harbor or river. As is shown, it is made of concrete, and is reinforced in a usual manner, as at $a$, and from its centre rises a pipe B which may be of cast iron of suitable height, which is filled with concrete and carries at its top an enclosed casing C, having one or more holes $c$ in it, so that it will be full of water. If the microphone is to be placed in deep water the holes may be omitted, the casing made watertight and filled with water all but a small air space before submerging. This will prevent excessive water pressure on the microphone diaphragm. To one side of the pipe B is attached a hook $B^1$, by means of which the device may be grappled when it is desired to raise it, and also an eye $B^2$, which is connected by a chain $B^3$ with a weight D, and chain $d$ connects this weight with a buoy $D^1$, which may be used if it is desirable to indicate the point at which the device may be found. The chain $B^3$ is loose so that water disturbances will not affect the microphone.

Within the casing C is mounted the microphone E. This microphone may be of any ordinary construction, and hence is not described. It is connected by a suitable cable $e$, with the receiving instrument on shore or elsewhere, this cable preferably passing down through a protecting tube $e^1$, embodied in the concrete with which the pipe B is filled, $e^2$ being a junction box of any suitable character by which the leads are connected. This form of my invention is particularly adapted for a location where disturbing noises, such as those of approaching submarines and ships can only come from substantially one direction.

Figure 2:
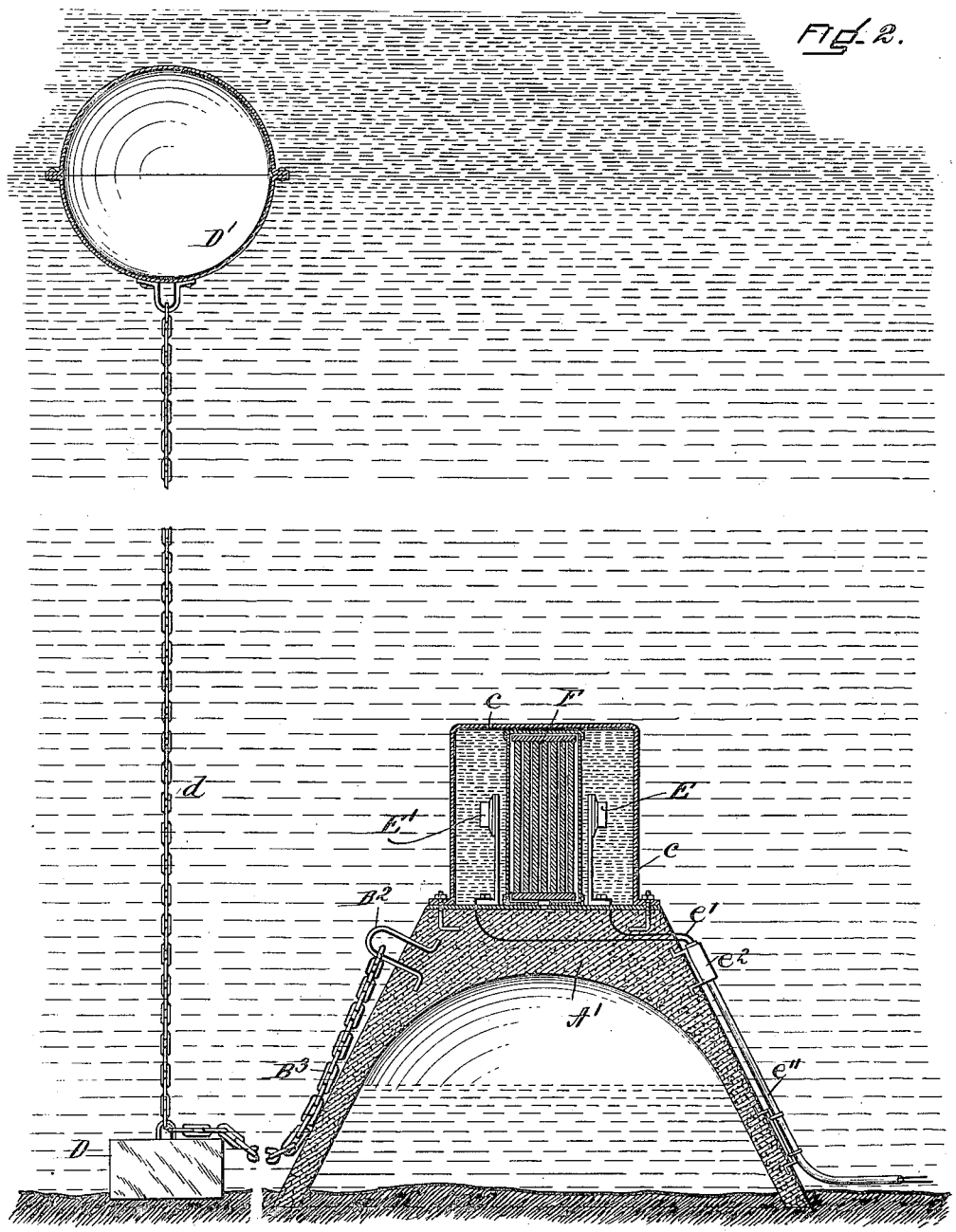
Fig. 2 is a similar view, showing two microphones separated by a sound screen.

In Fig. 2 I have shown a similar arrangement except that the microphones E and $E^1$ are back to back. This device is particularly useful where unexpected sounds may come from two opposing directions, or where a number of these detectors are arranged in a channel as shown in Fig. 3. In such case it is desirable that the sounds coming from one direction shall affect only the microphone facing in that direction, and shall not cross over and affect also the microphone facing the opposite direction. In order to prevent this I have shown at F a sound screen of a character described in Letters Patent of the United States No. 1,067,207 issued on my application, wherein the sound screen is described as composed of a metal watertight box in the interior of which are a series of partitions, preferably of wood and separated by air spaces. This screen effectively prevents sound waves coming from a given direction from passing entirely through to engage the opposite microphone.

It will be seen that sound waves approaching the microphone in a line normal to its face will be more effective at the receiver than those that strike the case of the microphone at an angle or from behind.

In this case the leads are carried out as before at $e^{11}$, each pair of leads coming to its own transmitter. In this figure I have shown the support $A^1$ or foundation for the casing, and other mechanism shaped somewhat differently from that shown in Fig. 1. This, however, is immaterial, forming no part of my invention. As in Fig. 1, however, a chain $B^3$ connects the foundation with the weight D which is connected by the chain $d$ with the buoy $D^1$.

In Fig. 3 I have shown diagrammatically a system of coast defense embodying the use more particularly of the arrangement shown in Fig. 2. G indicates the shores of a harbor inlet, for example, which it is desired to protect, $G^1$ being the channel. In the channel are placed say 2000 feet apart, a number of detectors of the kind shown in Fig. 2, and lettered C, $C^1$, $C^2$, $C^3$, $C^4$, respectively, the leads $e^{11}$ from which run to the shore station S. Preferably between each pair of detectors is located a mine M, $M^1$, $M^2$, $M^3$, of any kind which may be discharged from shore, $m$ being the leads or cables which run to appropriate mechanism at the observing station S which may be on shore or on another vessel. The mines may be otherwise located with relation to the detectors if thought best.

The sound waves caused by the incoming vessel V first strike the microphone E in the detector C and are communicated to the observer electrically by the indicator. They become stronger as the vessel nears detector C, being strongest when the vessel is over the detector, and at that moment the indications from microphone $E^1$ are also heard. The indications from E weaken and because of the sound screen F soon cease, while those from $E^1$ at C also diminish but those from E at detector $C^1$ become increasingly perceptible. The indications being at this moment strongest from microphones $E^1$ of detector C and E of detector $C^1$ the observer knows the position of the vessel to be between these two detectors, and so on with the course of the vessel up the channel. knowing the distance apart of the detectors he can time the various locations of the vessel with relation to the detectors and thus approximate the speed of the vessel and at the proper time explode a mine under her.

This system of detection may be used with particular advantage where the vessel cannot be seen as in a case of a fog or at night or in detecting a submerged submarine when the periscope at a distance might be easily overlooked. I do not mean to limit myself to the particular constructions or arrangements herein shown and described, as others may well suggest themselves to those skilled in the art. I have not shown any form of indicator nor the arrangement of the shore station as such elements are now well known.

Where the size of the harbor or the width of the channel justified it, the detectors and mines may be variously placed with relation to each other as circumstances may require, and also may be charted on a chart so that the particular detectors which are being energized may be located and other means than mines used for the extinction of the enemy vessel.

What I claim as my invention is:

1. The system of determining the position of a vessel, comprising a shore station, a series of submerged detectors, each consisting of a plurality of microphones, sound screens located to screen each microphone from sound waves arriving from any direction except the front thereof, and each microphone being separately connected to a shore station, said detectors being located with relation to each other, whereby a moving vessel in passing progressively over a plurality of said detectors will cause the operation of said microphones to convey to the shore station the location of said vessel.

2. A detecting mechanism of the kind described comprising an observation station, a plurality of groups of microphones connected thereto, each group comprising two microphones located back to back, and a sound screen located between said microphones, each microphone being separately connected to said observation station, one of the microphones in one group facing one of the microphones in the other group, whereby the position of the origin of the sound waves may be determined by comparison at the observation station of the indications from the several microphones.

3. A device of the kind described comprising a submerged foundation adapted to rest on the bottom of a body of water and be removable therefrom, a liquid-filled casing mounted thereon, a water tight microphone mounted in said casing, a buoy, means for anchoring said buoy, and means for loosely connecting said anchoring means and said foundation.

ROBERT L. WILLIAMS.